(12) United States Patent
Sato et al.

(10) Patent No.: US 9,986,168 B2
(45) Date of Patent: May 29, 2018

(54) IMAGE PICKUP APPARATUS

(71) Applicant: SONY CORPORATION, Tokyo (JP)

(72) Inventors: Mayuko Sato, Tokyo (JP); Fumikazu Hatanaka, Tokyo (JP); Toshiyuki Kaimi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/306,948

(22) PCT Filed: Mar. 24, 2015

(86) PCT No.: PCT/JP2015/058838
§ 371 (c)(1),
(2) Date: Oct. 26, 2016

(87) PCT Pub. No.: WO2015/170521
PCT Pub. Date: Nov. 12, 2015

(65) Prior Publication Data
US 2017/0054914 A1 Feb. 23, 2017

(30) Foreign Application Priority Data

May 8, 2014 (JP) .................. 2014-097048
May 14, 2014 (JP) .................. 2014-100396

(51) Int. Cl.
*H04N 5/232* (2006.01)
*G03B 13/06* (2006.01)
(Continued)

(52) U.S. Cl.
CPC ......... *H04N 5/23293* (2013.01); *G03B 13/06* (2013.01); *G03B 15/00* (2013.01); *G03B 17/04* (2013.01); *G03B 17/18* (2013.01); *G03B 17/20* (2013.01); *H04N 5/225* (2013.01); *H04N 5/232* (2013.01); *H04N 5/23222* (2013.01); *H04N 5/23245* (2013.01)

(58) Field of Classification Search
CPC ........... H04N 5/23293; H04N 5/23216; H04N 5/23241; G06F 3/04842; G06F 1/1654
See application file for complete search history.

(56) References Cited

U.S. PATENT DOCUMENTS 7,701,500 B2 * 4/2010 Aizawa ................ G11B 27/034
348/231.2
9,426,372 B2 * 8/2016 Ichikawa ............. H04N 5/2624
(Continued)

FOREIGN PATENT DOCUMENTS

JP 60-121431 A 6/1985
JP SHO 60-121431 A 6/1985
(Continued)

Primary Examiner — Trung Diep
(74) Attorney, Agent, or Firm — Chip Law Group

(57) ABSTRACT

An image pickup apparatus of the disclosure includes a body, a display section, and a display controller. The display section is pivotable on the body between a first state in which a display surface is oriented to rear surface side of the body and a second state in which the display surface is oriented to front surface side of the body. The display controller varies an arrangement state of a predetermined icon depending on orientation of the body, when the display section is in the second state. The predetermined icon is displayed on the display section.

8 Claims, 18 Drawing Sheets

(51) Int. Cl.
*G03B 15/00* (2006.01)
*G03B 17/04* (2006.01)
*G03B 17/18* (2006.01)
*G03B 17/20* (2006.01)
*H04N 5/225* (2006.01)

(56) References Cited

U.S. PATENT DOCUMENTS

2010/0165128 A1* 7/2010 Lee ................... H04N 5/232
   348/208.4
2014/0300791 A1* 10/2014 Shirono ............. H04N 5/23293
   348/333.06

FOREIGN PATENT DOCUMENTS

| | | |
|---|---|---|
| JP | 2001-268402 A | 9/2001 |
| JP | 2005-257869 A | 9/2005 |
| JP | 2006-325008 A | 11/2006 |
| JP | 2008-053925 A | 3/2008 |
| JP | 2010-103921 A | 5/2010 |
| JP | 2014-022977 A | 2/2014 |

* cited by examiner

[ FIG. 1 ]
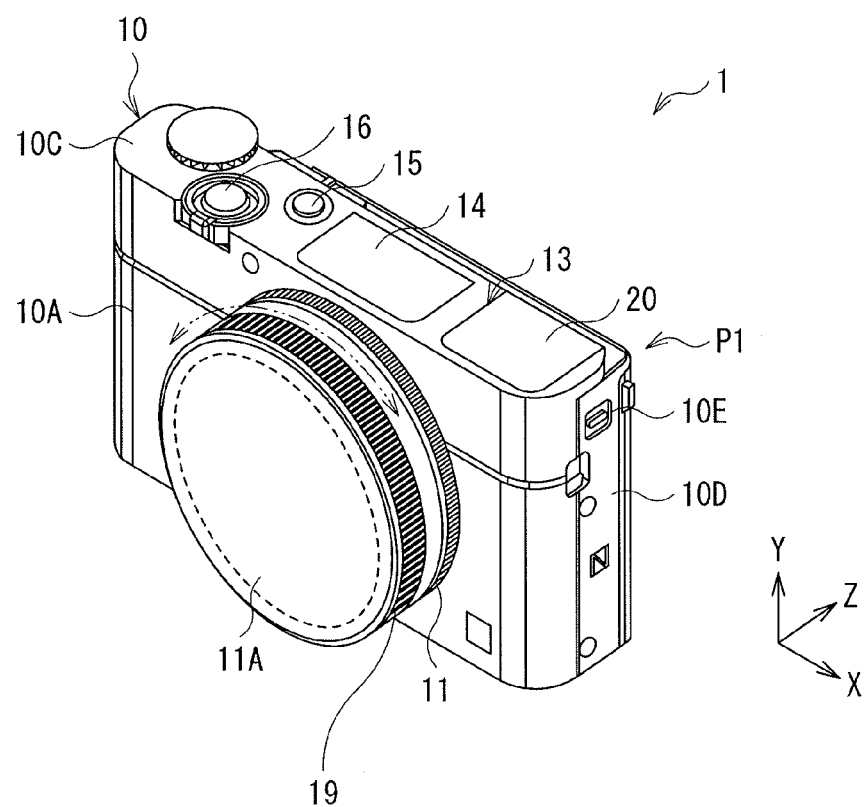

[ FIG. 2 ]
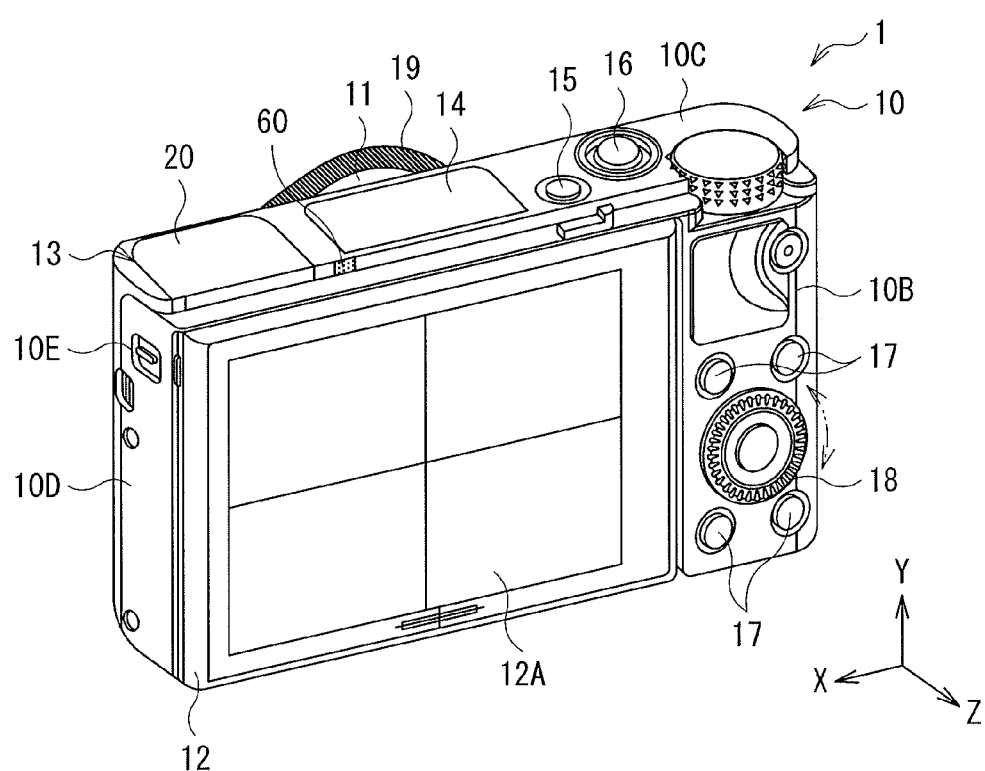

[ FIG. 3 ]
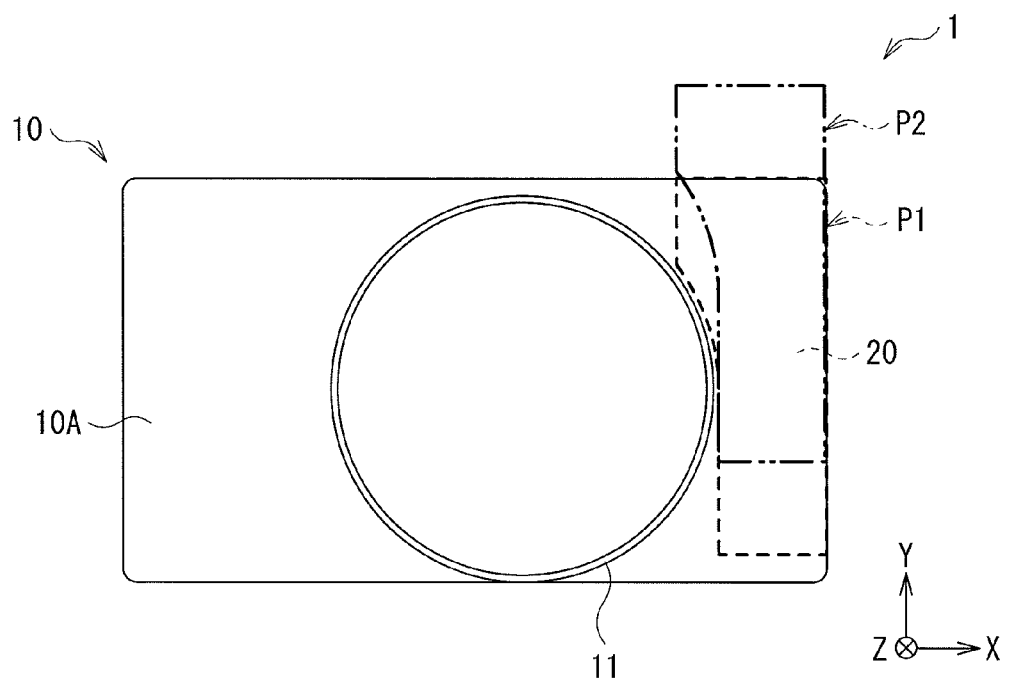

[ FIG. 4 ]
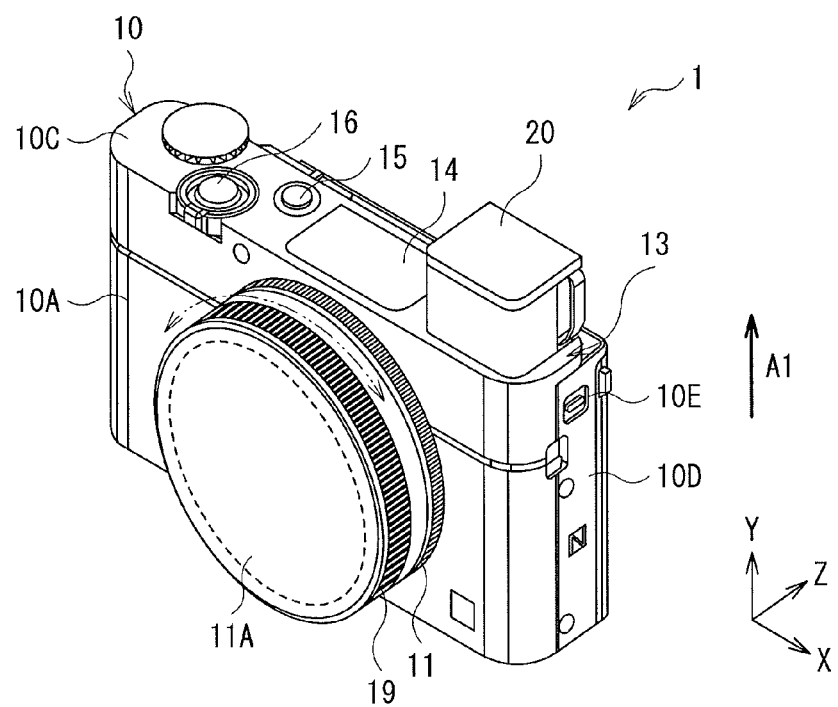

[ FIG. 5 ]
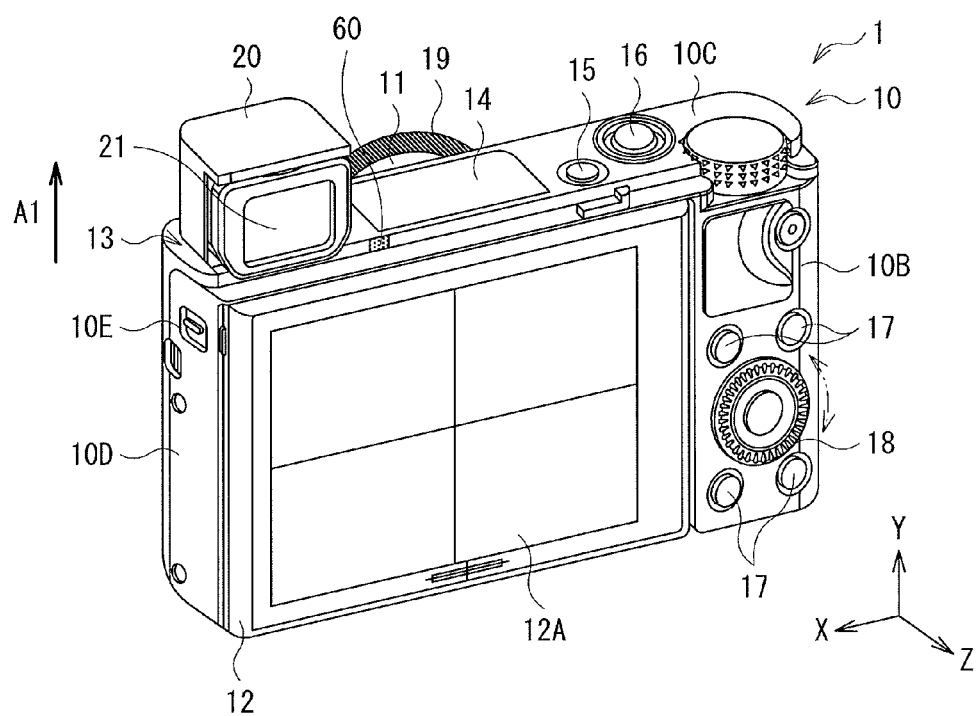

[ FIG. 6 ]
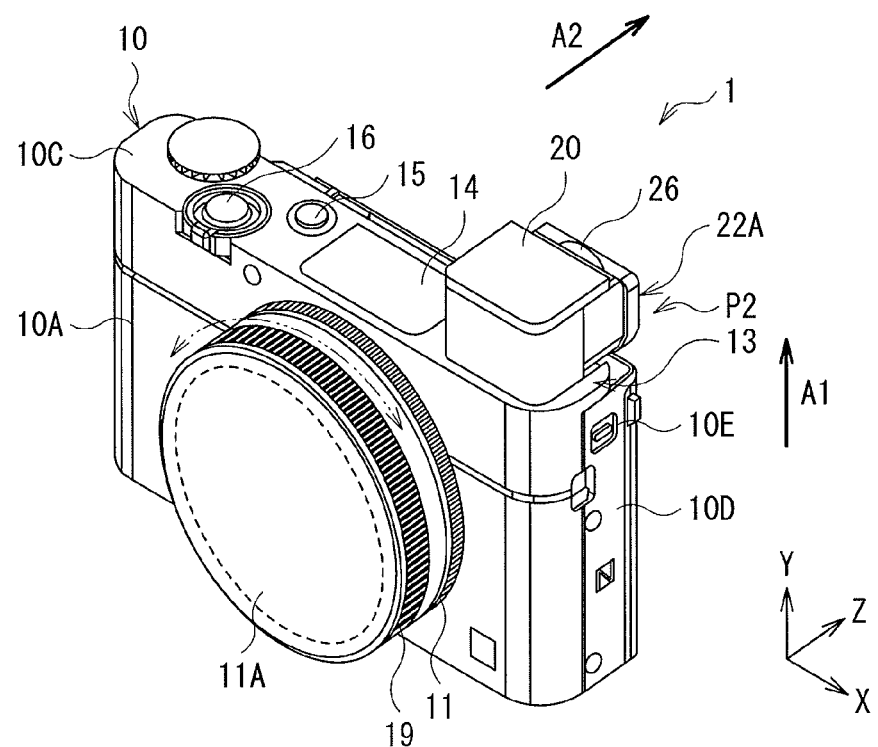

[ FIG. 7 ]
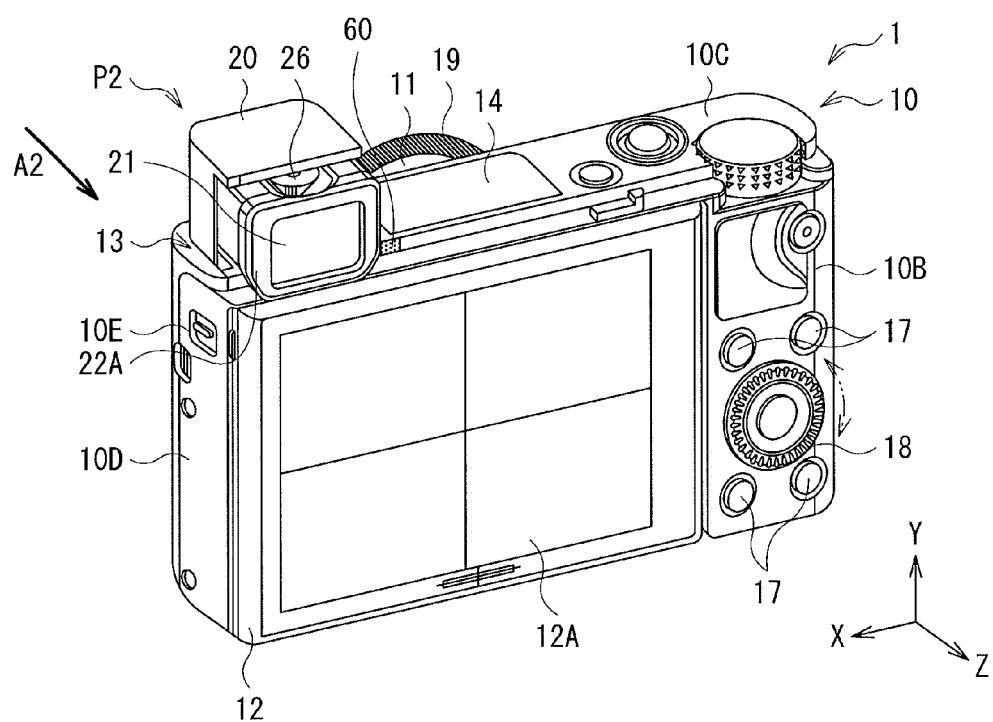

[ FIG. 8 ]
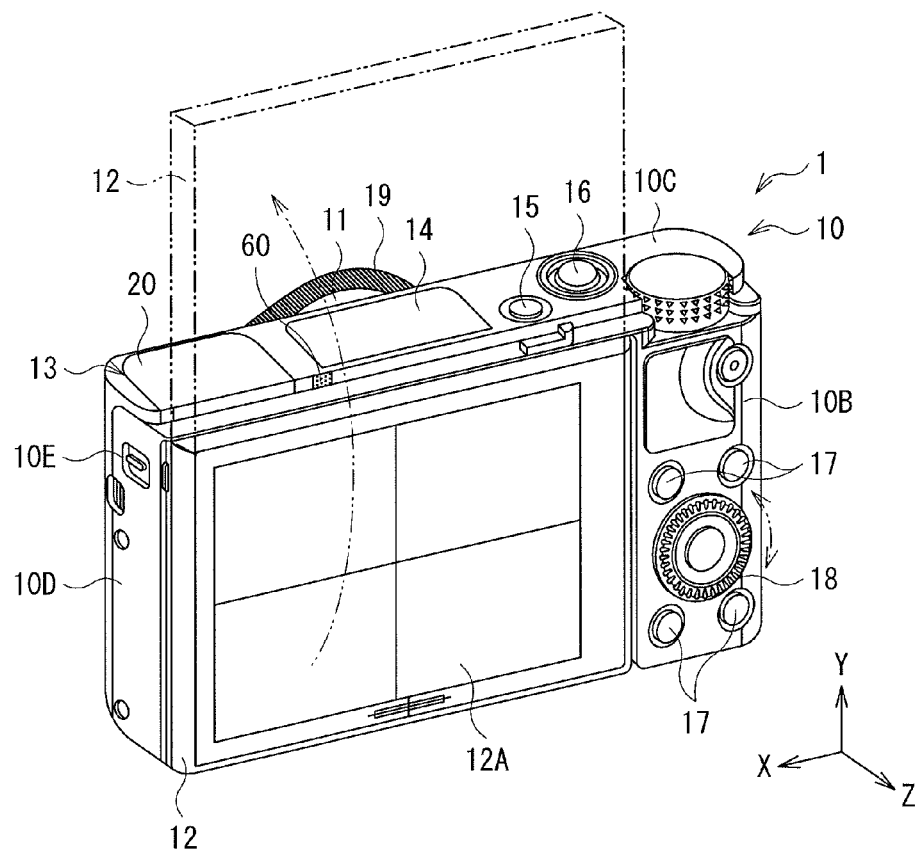

[ FIG. 9 ]
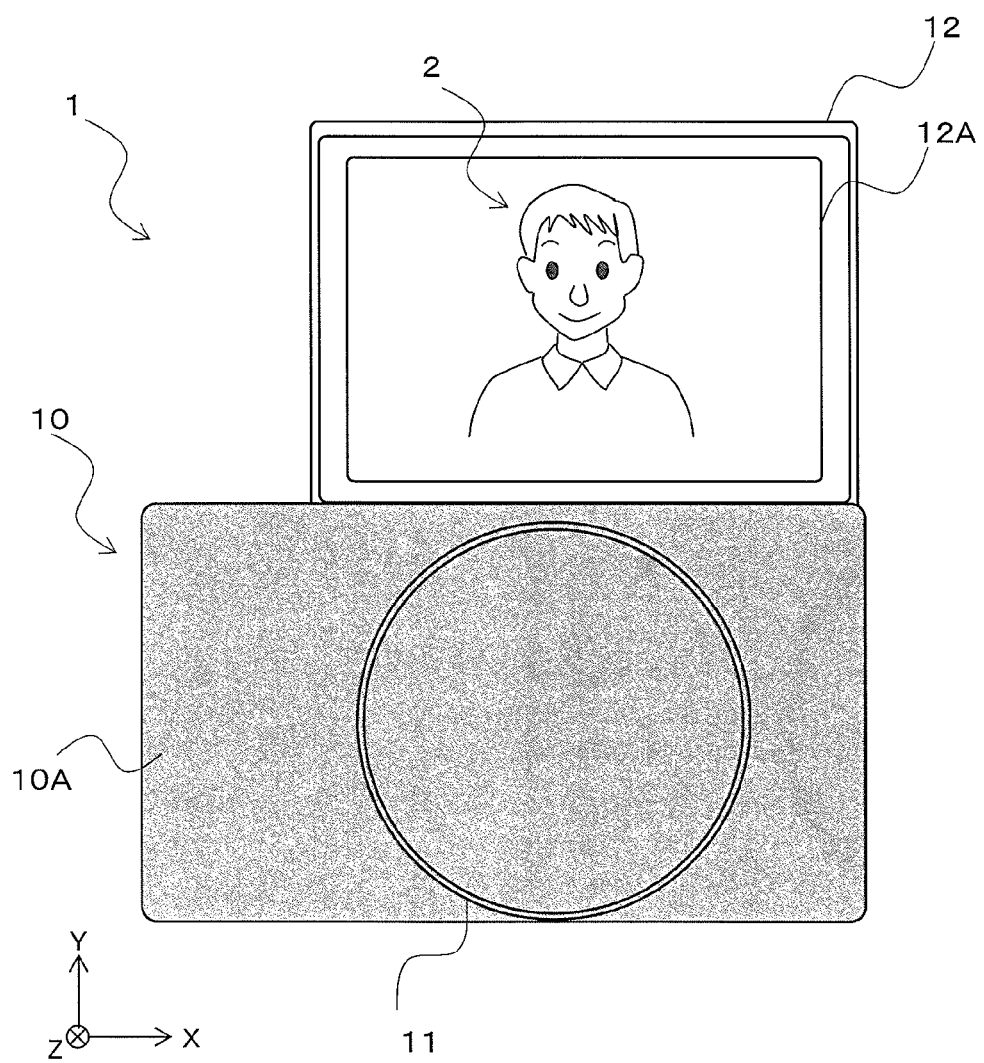

[ FIG. 10 ]
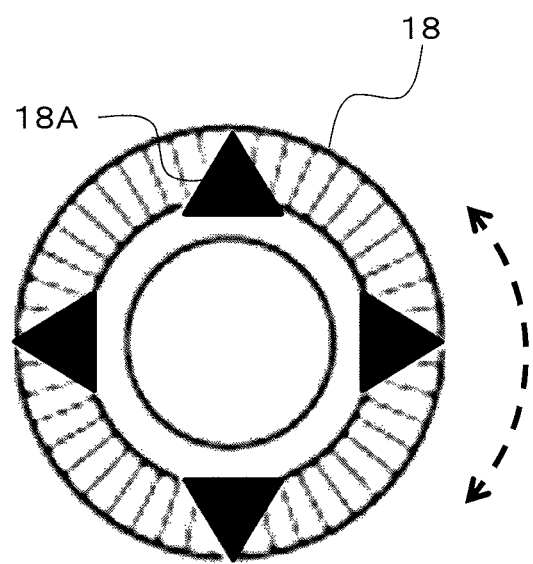

[ FIG. 11 ]
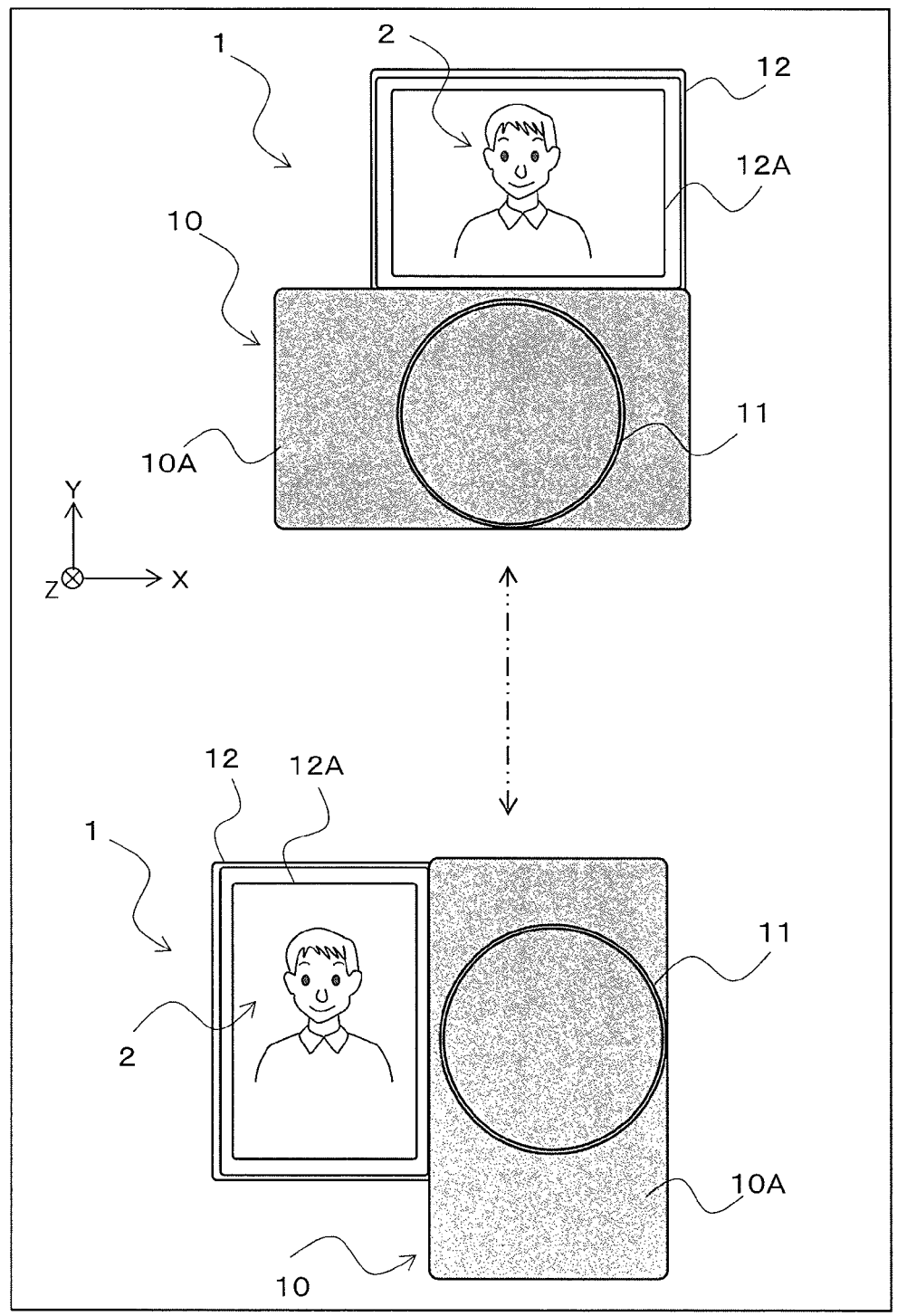

[ FIG. 12 ]
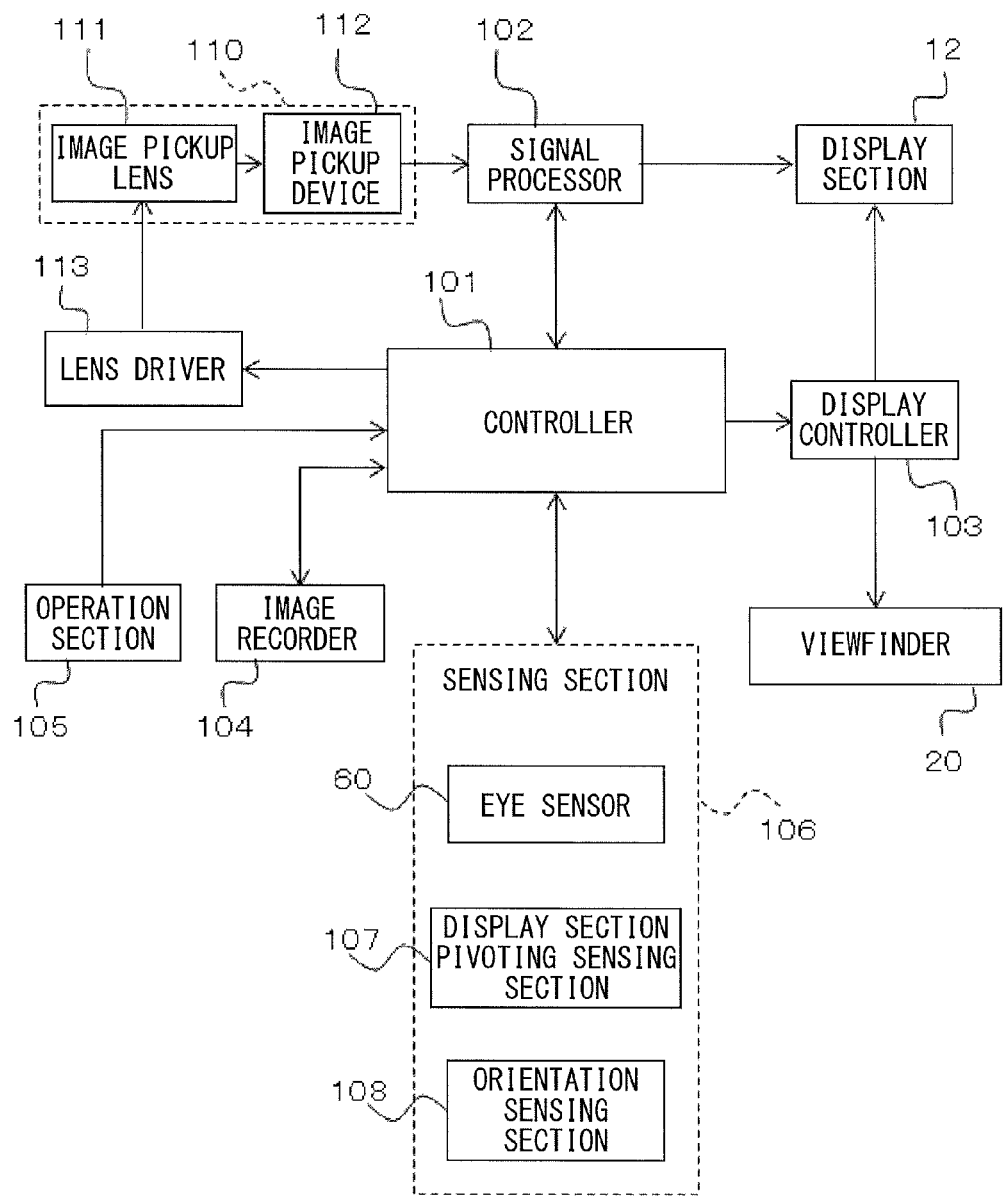

[ FIG. 13 ]
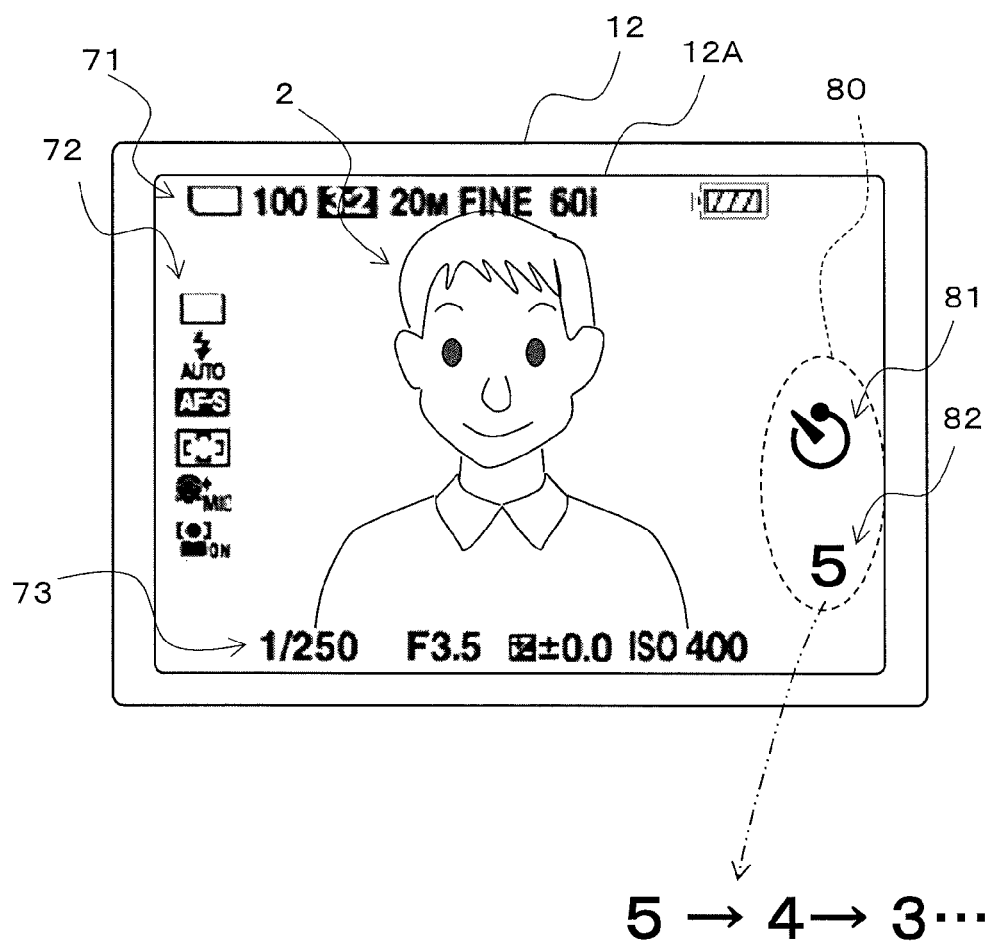

[ FIG. 14 ]
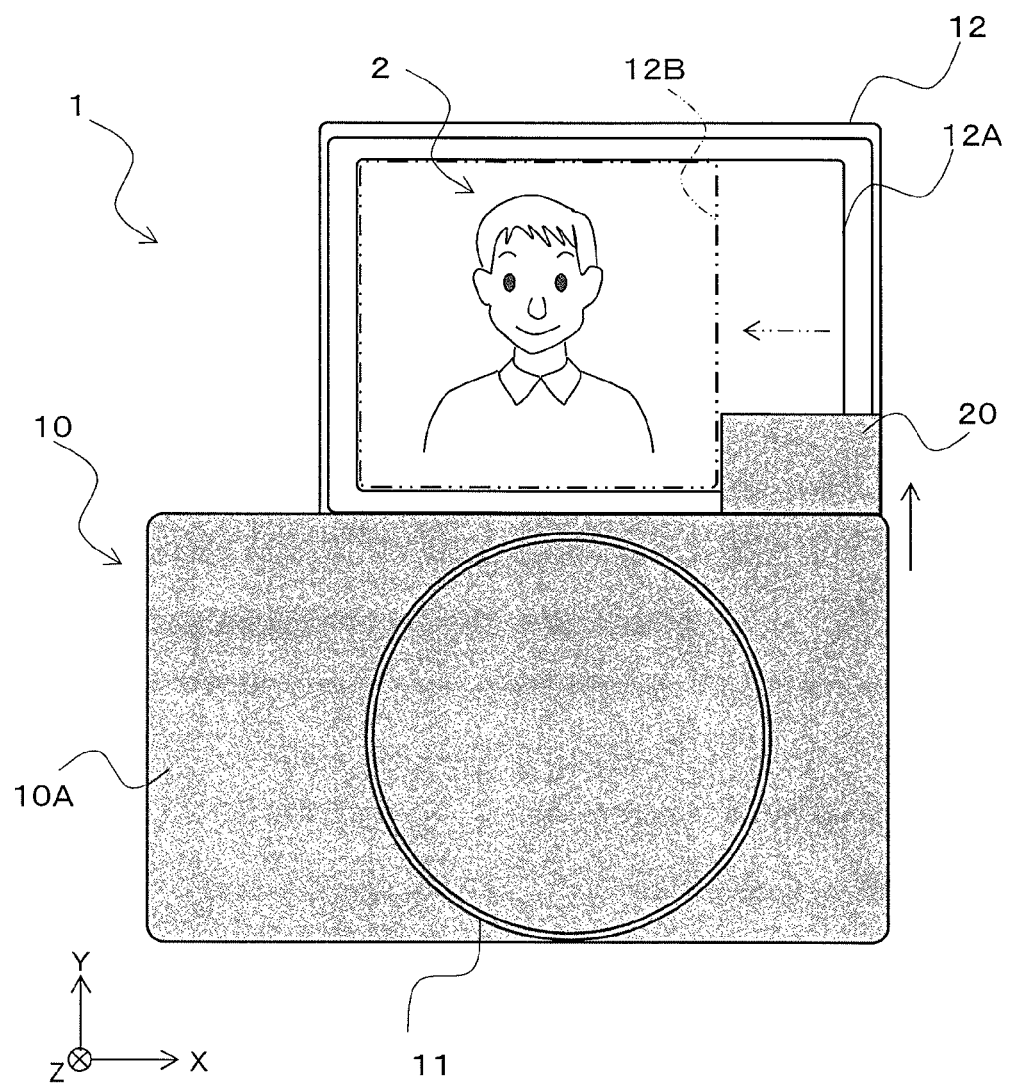

[ FIG. 15 ]
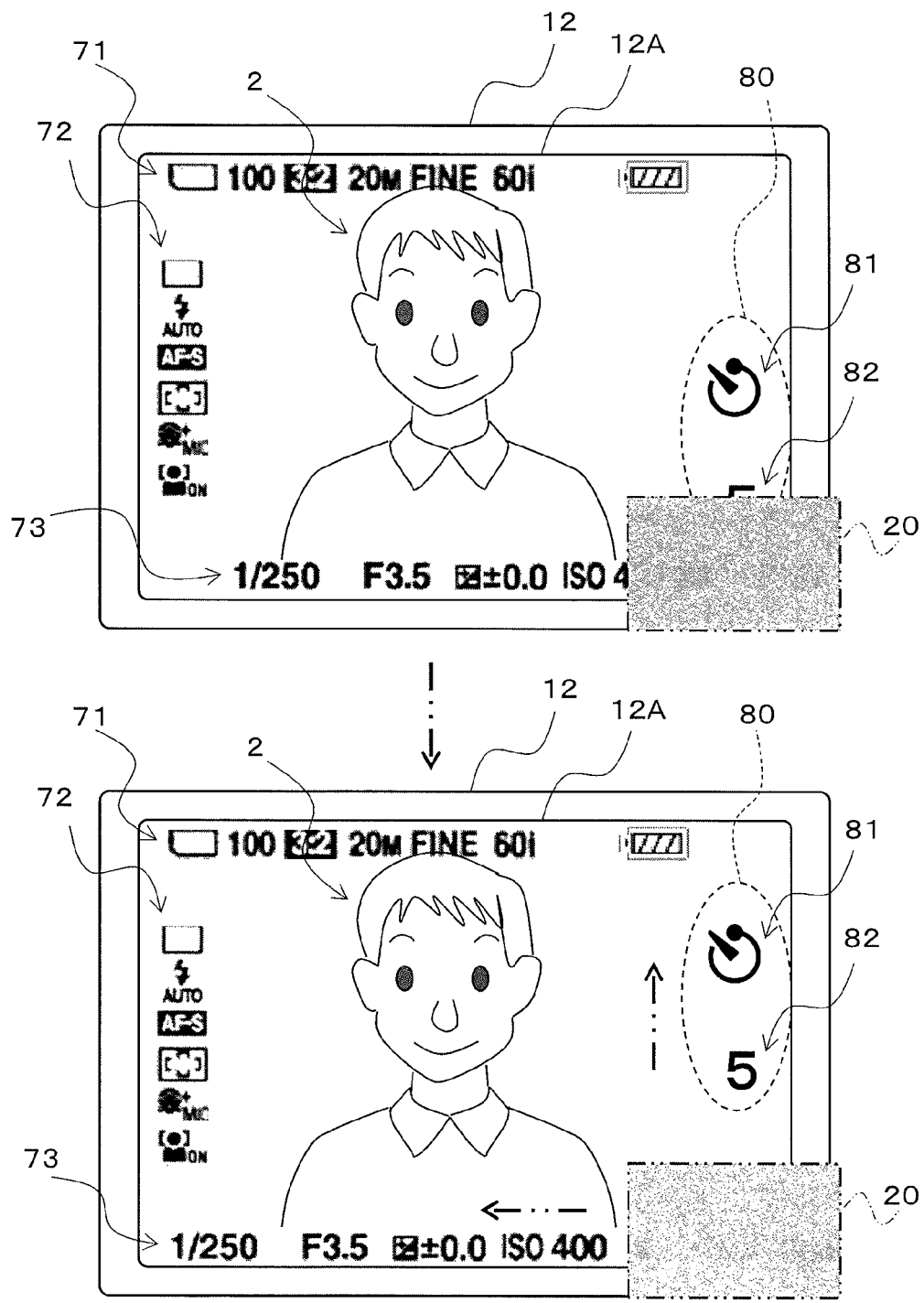

[ FIG. 16 ]
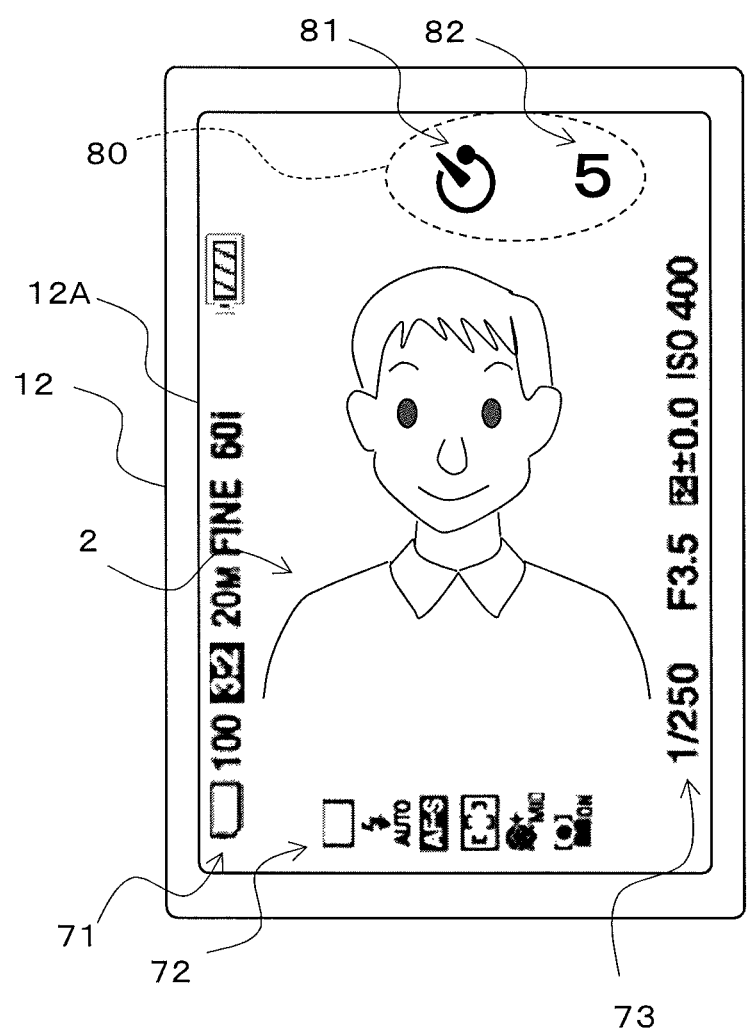

[ FIG. 17 ]
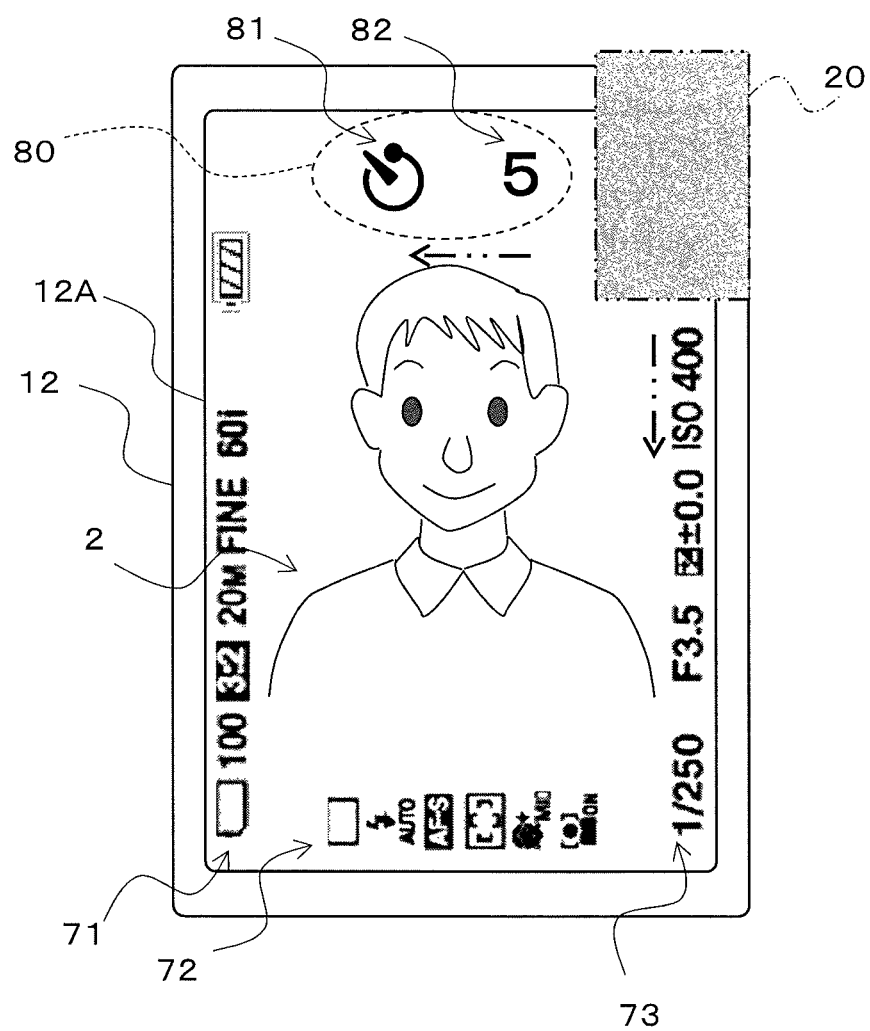

[ FIG. 18 ]
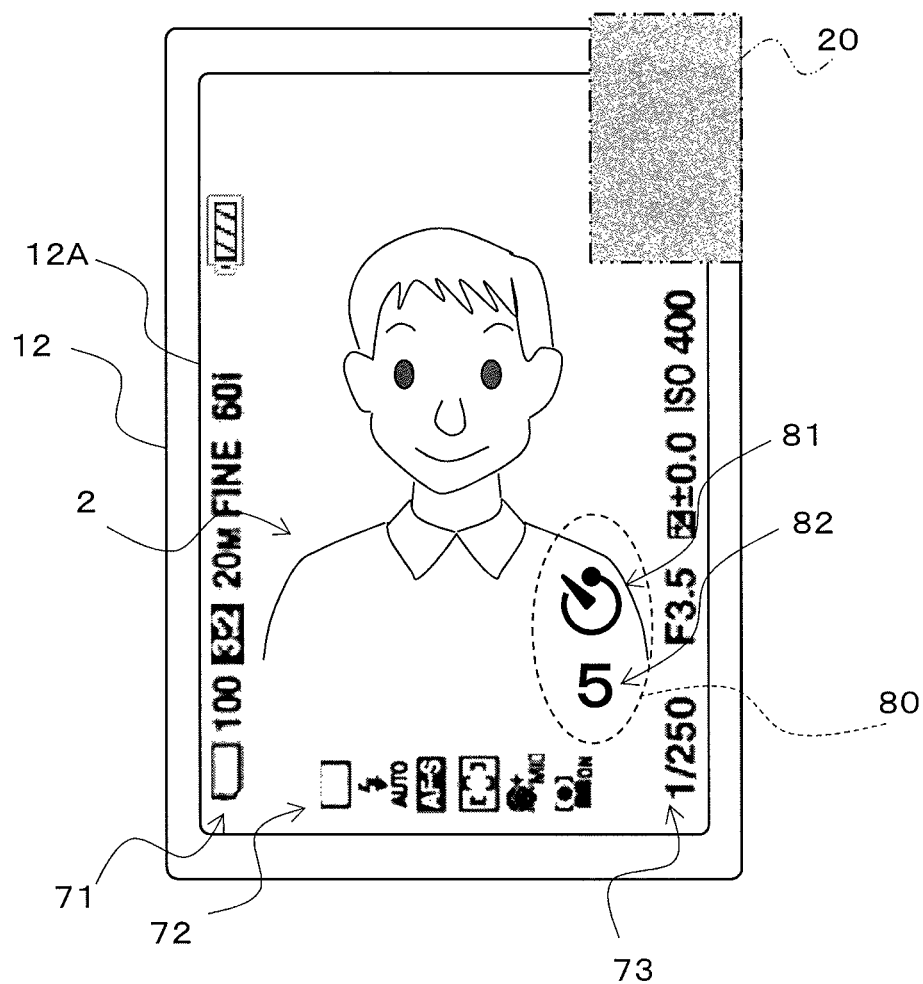

IMAGE PICKUP APPARATUS

CROSS REFERENCE TO RELATED APPLICATIONS

This application is a U.S. National Phase of International Patent Application No. PCT/JP2015/058838 filed on Mar. 24, 2015, which claims priority benefit of Japanese Patent Application No. JP 2014-097048 filed in the Japan Patent Office on May 8, 2014 and Japanese Patent Application No. JP 2014-100396 filed in the Japan Patent Office on May 14, 2014. Each of the above-referenced applications is hereby incorporated herein by reference in its entirety.

TECHNICAL FIELD

The disclosure relates to an image pickup apparatus that is suitable for an apparatus such as a compact digital still camera (DSC).

BACKGROUND ART

An image pickup apparatus with a viewfinder that is foldable along a body or is containable inside the body has been proposed, taking into consideration reduction in size for the sake of convenience in carrying the image pickup apparatus, for example, as disclosed in PTL 1 or PTL 2. Such an image pickup apparatus is so configured that a user (a photographer) pulls out the viewfinder in a direction toward the user upon using the viewfinder.

CITATION LIST

Patent Literature

[PTL 1] Japanese Unexamined Patent Application Publication No. S60-121431
[PTL 2] Japanese Unexamined Patent Application Publication No. 2001-268402

SUMMARY OF INVENTION

An image pickup apparatus provided with a display panel besides a viewfinder is also known. The display panel may display information on shooting as an icon, or may display an image such as a so-called live-view image and an image that has been shot. Such an image pickup apparatus may include a display panel that is so attached to a body of the image pickup apparatus as to be pivotable on the body. For example, an image pickup apparatus is known in which a state of the display panel is variable between a first pivoting state in which a display surface is oriented to rear surface side of the body and a second pivoting state in which the display surface is oriented to front surface side of the body.

Such an image pickup apparatus makes it possible to easily shoot a so-called "selfie", that is, to direct an image pickup lens toward a photographer oneself to shoot an image of the photographer oneself. This may be achieved due to the second pivoting state in which the display surface of the display panel is oriented to the front surface side, for example. Further, orientation of the body of the image pickup apparatus may be varied from a horizontal state to a vertical state in some cases, when shooting an image such as a selfie using such an image pickup apparatus. In a case where orientation of a component such as the display panel and the body is variable between various states in such a manner, it is preferable to display icons, etc. displayed on the display panel in appropriate positions, an appropriate arrangement, etc., depending on shooting circumstances.

It is desirable to provide an image pickup apparatus that performs appropriate information display depending on shooting circumstances.

An image pickup apparatus according to one embodiment of the disclosure including: a body; a display section that is pivotable on the body between a first state in which a display surface is oriented to rear surface side of the body and a second state in which the display surface is oriented to front surface side of the body; and a display controller that varies an arrangement state of a predetermined icon depending on orientation of the body, when the display section is in the second state, the predetermined icon being displayed on the display section.

The image pickup apparatus of the embodiment of the disclosure has a configuration in which the arrangement state of the predetermined icon displayed on the display section is varied depending on the orientation of the body, when the display surface of the display section is oriented to the front surface side.

According to the image pickup apparatus of the embodiment of the disclosure, the arrangement state of the predetermined icon displayed on the display section is varied depending on the orientation of the body, when the display surface of the display section is oriented to the front surface side. This makes it possible to perform appropriate information display depending on shooting circumstances.

It is to be noted that effects of the disclosure are not necessarily limited to the effects described above and may include any of effects described herein.

BRIEF DESCRIPTION OF DRAWINGS

FIG. 1 is a perspective view of a configuration of an image pickup apparatus according to an embodiment of the disclosure, as viewed from front surface side thereof.

FIG. 2 is a perspective view of the configuration of the image pickup apparatus illustrated in FIG. 1, as viewed from rear surface side thereof.

FIG. 3 is a front view for describing a location of a viewfinder inside a body at a contained position illustrated in FIG. 1.

FIG. 4 is a perspective view of a state, of the image pickup apparatus illustrated in FIG. 1, in which the viewfinder that has been contained at the contained position is popped up from the body.

FIG. 5 is a perspective view of a configuration of the image pickup apparatus illustrated in FIG. 4, as viewed from the rear surface side thereof.

FIG. 6 is a perspective view of a state, of the image pickup apparatus illustrated in FIG. 4, in which the viewfinder is moved backward (to the rear surface side) of the body to be located at a use position.

FIG. 7 is a perspective view of a configuration of the image pickup apparatus illustrated in FIG. 6, as viewed from the rear surface side thereof.

FIG. 8 is a perspective view of an example of a second state of a display section.

FIG. 9 is a front view illustrating an example of the second state of the display section.

FIG. 10 is a diagram for explaining details of a control wheel.

FIG. 11 is a diagram for explaining an example of a state of orientation of the body.

FIG. 12 is a block diagram illustrating a configuration example of a control system circuit.

FIG. 13 is a diagram for explaining an example of icons, etc. that are displayed on the display section.

FIG. 14 is a front view of an example of a display region in a case where the display section is in the second state and the viewfinder is popped up.

FIG. 15 is a diagram for explaining a display example of icons in the case where the display section is in the second state and the viewfinder is popped up.

FIG. 16 is a diagram for explaining a display example of the icons in a case where the display section is in the second state and the body is oriented vertically.

FIG. 17 is a diagram for explaining a display example of the icons in a case where the display section is in the second state, the body is oriented vertically, and the viewfinder is popped up.

FIG. 18 is a diagram for explaining another display example of the icons in the case where the display section is in the second state, the body is oriented vertically, and the viewfinder is popped up.

DESCRIPTION OF EMBODIMENTS

Some embodiments of the disclosure are described below in detail with reference to the drawings. It is to be noted that the description is given in the following order.
<1. Configuration>
[1.1 Overall Configuration Example of Image Pickup Apparatus] (FIGS. 1 to 11)
[1.2 Configuration Example of Control System] (FIGS. 12 and 13)
<2. Operation>
[2.1 Basic Operation Example of Image Pickup Apparatus]
[2.2 Display Examples of Display Section] (FIGS. 14 to 18)
<3. Effects>
<4. Other Embodiments>

1. First Embodiment

[1.1 Overall Configuration Example of Image Pickup Apparatus]

FIG. 1 illustrates a configuration of an image pickup apparatus 1 according to one embodiment of the disclosure, as viewed from the front. FIG. 2 illustrates the configuration of the image pickup apparatus 1, as viewed from the back. The image pickup apparatus 1 may be a compact digital single-lens camera, for example. The image pickup apparatus 1 may include a body 10 and a viewfinder 20. Referring to FIG. 3, the viewfinder 20 may be contained at a contained position P1 inside the body 10 when the viewfinder 20 is not in use, and may be popped up to a use position P2 outside the body 10 when the viewfinder 20 is in use.

The body 10 may have an approximate rectangular-parallelepiped shape that is longer in a horizontal direction, for example. The body 10 may include a front surface 10A, a rear surface 10B, a top surface 10C, and a side surface 10D, for example. A body mount 11 may be provided on the front surface 10A of the body 10. Further, the body 10 may contain, for example, an image pickup device 112 and various control system circuits such as a signal processor 102 illustrated in FIG. 12 describe later. A viewfinder operation section 10E may be provided on the side surface 10D of the body 10. The viewfinder operation section 10E may be provided to pop up the viewfinder 20.

A power button 15 and a shutter button 16 may be provided on the top surface 10C of the body 10. A display section 12 may be provided on the rear surface 10B of the body 10. A plurality of operation buttons 17 and a control wheel 18 may be also provided on the rear surface 10B of the body 10. The control wheel 18 may be one of directional selection sections that allow for selection of contents to be displayed on the display section 12 by means of an operation direction. Referring to FIG. 10, the control wheel 18 may have a function as an operation button 18A that is operable in upward, downward, rightward, and leftward directions, for example. The control wheel 18 may also be one of ring-like operation sections that each have an operation direction that is variable between a clockwise direction and a counterclockwise direction. The contents to be displayed on the display section 12 such as predetermined shooting information may be selected by means of the operation direction of the control wheel 18, for example.

Further, an eye sensor 60 may be provided near the viewfinder 20, also on the rear surface 10B of the body 10. The eye sensor 60 may detect whether a user (a photographer) is looking into the viewfinder 20, by means of a magnetic sensor, for example.

It is to be noted that, in FIGS. 1 and 2, the front is front surface side of the body 10, and is lens side or subject side in a front-back direction Z of the body 10. The back is rear surface side of the body 10. It is to be noted that the front-back direction Z may be the same as an optical axis direction of an image pickup lens 111 illustrated in FIG. 12 described later that is attached to the body 10. Further, a right-left direction of the body 10 is referred to as an X direction, and a top-bottom direction of the body 10 is referred to as a Y direction. The same is applicable to other drawings referred to below.

The body mount 11 may mechanically or electrically couple the body 10 and the interchangeable image pickup lens 111 illustrated in FIG. 12 described later to each other. The user may select the interchangeable image pickup lens 111 depending on its use. The selected image pickup lens 111 may be coupled to the body 10. It is to be noted that FIG. 1 illustrates a state in which the body mount 11 is covered with a cap 11A.

The body mount 11 may be also provided with a control ring 19. The control ring 19 may be one of the directional selection sections that allows for selection of contents to be displayed on the display section 12 by means of an operation direction. The control ring 19 may also be one of the ring-like operation sections that each have an operation direction that is variable between the clockwise direction and the counterclockwise direction. The contents to be displayed on the display section 12 such as predetermined shooting information may be selected by means of the operation direction of the control ring 19, for example.

The viewfinder 20 may be provided for visually confirming an image to be shot to perform operations such as composition setting and focusing. The viewfinder 20 may be an optical viewfinder (OVF) or an electronic viewfinder (EVF). For example, when the viewfinder 20 is the electronic viewfinder, the viewfinder 20 may include an unillustrated eyepiece and an unillustrated display screen behind a viewing window 21 (not illustrated in FIGS. 1 to 3, see FIG. 7). The display screen may be a liquid crystal display screen or an organic electroluminescence (EL) display screen, for example.

Further, the viewfinder 20 may be movable in two or more directions between the contained position P1 at which the viewfinder 20 is contained inside the body 10 and the use position P2 at which the viewfinder 20 is popped up to outside of the body 10. This allows for reduction in size of the image pickup apparatus 1.

The viewfinder 20 may be preferably movable in two directions that are orthogonal to each other. Specifically, it may be preferable that the viewfinder 20 stretch out upward (be popped up) from the body 10 from the contained position P1 (see FIGS. 1 to 3) as illustrated by an arrow A1 in FIGS. 4 and 5, and be moved backward of the body 10 (in a direction to be closer to the user's eye) as illustrated by an arrow A2 in FIGS. 6 and 7 thereafter to arrive at the use position P2. The use position P2 may be located on the upper side of the body 10 by popping up the viewfinder 20 from the body 10. This allows for a configuration similar to a configuration of a usual digital single-lens camera in which the viewfinder 20 is located on the upper side of a component such as a lens barrel and the display section 12. This makes it possible to improve usability for the user. Further, a clearance to the user's eye is reduced by moving the viewfinder 20 backward of the body 10. This makes it possible to improve light blocking characteristics.

The viewfinder 20 may be preferably moved backward of the body 10 by an amount that allows a surface 22A to be in contact with the user's eye of the viewfinder 20 to be located at a position that is farther in the back compared to the rear surface 10B (the display section 12) of the body 10, for example. This reduces the clearance to the user's eye, and decreases possibility that the user's nose hits the display section 12. As a result, usability is improved.

The body 10 may preferably have an opening 13 on the top surface 10C. The viewfinder 20 may be popped out from the body 10 through the opening 13 and may be contained inside the body 10 through the opening 13. This allows for provision of the opening 13, through which the viewfinder 20 is popped up from and contained inside the body 10, at a location other than the rear surface 10B of the body 10. This makes it easier to achieve increase in size of the lens barrel and increase in size of the screen of the display section 12. Incidentally, in a case where the opening 13 is provided on the rear surface 10B of the body 10, when the size of the body 10 is increased or kept as it is, the size of the lens barrel may be reduced. This may lead to decrease in magnification, brightness, and size of the image pickup device. The size of the display section 12 may also be reduced.

It is to be noted that the location of the opening 13 illustrated in FIGS. 1 to 3 may be a location where an electronic flash is arranged in a usual digital single-lens camera. An electronic flash 14 in the present embodiment may be located closer to the middle than the opening 13, which is different from the usual location of the electronic flash.

It may be preferable that the viewfinder 20 be so located as to avoid the body mount 11 as illustrated in FIG. 3 described above. This allows for avoidance of interference of the viewfinder 20 with the lens barrel. It is to be noted that the viewfinder 20 may overlap the display section 12 as viewed from the back.

The viewfinder 20 may be provided with a diopter adjuster 26 as illustrated in FIGS. 6 and 7. The diopter adjuster 26 may be an operation section (such as a lever, a knob, or a dial) for adjusting diopter of the viewfinder 20 depending on eyesight of the user. The diopter adjuster 26 may be preferably provided on a top surface of a viewfinder unit that configures the viewfinder 20. Further, the diopter adjuster 26 may be preferably hidden inside the body 10 when the viewfinder 20 is located at the contained position P1 as illustrated in FIGS. 1 to 3, and may be preferably exposed when the viewfinder 20 is located at the use position P2 as illustrated in FIGS. 6 and 7. Thus limiting accessibility to the diopter adjuster 26 allows for avoidance of unintentional operation of the diopter adjuster 26 which leads to unintentional change in setting. Further, this reduces an amount of the diopter adjuster 26 that is exposed from the top surface of the viewfinder unit. This allows for decrease in possibility that the setting is reset due to returning of the viewfinder 20 from the use position P2 to the contained position P1. Thus, troublesome re-adjustment of the diopter adjuster 26 for every use may be eliminated. As a result, it is possible to improve convenience for the user.

The display section 12 may be a liquid crystal panel, for example. The display section 12 may display various pieces of predetermined shooting information that are related to shooting. The predetermined shooting information may be a live-view image of a subject 2, icon-like display, etc. as illustrated in FIG. 13 described later. The display section 12 may also display various menu display related to the setting of the apparatus, an electronic level, etc.

Referring to FIGS. 8 and 9, the display section 12 is pivotable on the body 10 between a first state in which a display surface 12A is oriented to the rear surface side of the body 10 and a second state in which the display surface 12A is oriented to the front surface side of the body 10. The display section 12 may be pivotable by 180 degrees on one side of an upper portion of the body 10 as illustrated in FIG. 8, for example.

By allowing the display section 12 to be in the second state, it is possible to easily shoot a so-called "selfie", that is, to direct the image pickup lens 111 (FIG. 12) toward a photographer oneself to shoot an image of the photographer oneself. The photographer is allowed to perform shooting while confirming a through view of the subject 2 including the photographer oneself on the display section 12.

It is to be noted that the image pickup apparatus 1 may allow for appropriate selection, depending on preference of the photographer, between shooting with the body 10 oriented horizontally as illustrated in an upper part of FIG. 11 and shooting with the body 10 oriented vertically as illustrated in a lower part of FIG. 11, in a case such as a case of shooting a selfie.

[1.2 Configuration Example of Control System]

FIG. 12 illustrates a configuration example of a control system circuit of the image pickup apparatus 1.

The image pickup apparatus 1 may include a controller 101, a signal processor 102, a display controller 103, an image recorder 104, an operation section 105, and a sensing section 106, as the control system circuit. The image pickup apparatus 1 may further include an image pickup section 110 and a lens driver 113. The image pickup section 110 may include the image pickup lens 111 and the image pickup device 112. The sensing section 106 may include the eye sensor 60, a display section pivoting sensing section 107, and an orientation sensing section 108.

The image pickup lens 111 may form an optical image of a subject on the image pickup device 112. The image pickup lens 111 may include a plurality of lenses. Factors such as optical zooming magnification and focusing may be adjusted by causing the lenses to travel. The image pickup device 112 may form an image of the subject on a light receiving surface through the image pickup lens 111 and generate an electric signal by photoelectric conversion. The image pickup device 112 may be a complementary metal oxide semiconductor (CMOS) image sensor, for example. The lens driver 113 may drive the lenses in the image pickup lens 111 for adjusting the factors such as the optical zooming magnification, an F-value, and focusing.

The signal processor 102 may perform various signal processing on an image pickup signal supplied from the image pickup device 112, thereby generating data such as data of images to be displayed on the viewfinder 20 and the display section 12 and image data to be recorded by the image recorder 104.

The image recorder 104 may record the image data in an unillustrated recording medium inside the body or an unillustrated recording medium outside the body.

The operation section 105 may include the power button 15, the shutter button 16, the operation buttons 17, the control wheel 18, the operation button 18A, and the control ring 19, illustrated in FIGS. 1 to 10 described above.

The controller 101 may perform overall control of the respective sections in the image pickup apparatus 1. The controller 101 may have a function as an image pickup controller that performs control depending on a shooting mode. One example of the shooting mode may be a self-timer mode in which actual shooting processing is executed after predetermined time has passed since an instruction for starting shooting has been made.

The display controller 103 may perform display control of the viewfinder 20 and the display section 12. The display controller 103 may perform display control of various pieces of shooting information related to shooting that are to be displayed on the viewfinder 20 and the display section 12, for example. For example, the display controller 103 may perform control of a live-view image of the subject 2, icon-like display, etc. as illustrated in FIG. 13. The display controller 103 may also perform display control of various menu display related to the setting of the apparatus, the electronic level, etc. The display controller 103 may execute display control for displaying text, images, and other various pieces of information on the display section 12, on the basis of the control performed by the controller 101. The display section 12 may display the text, the images, and the other various pieces of information, display of which is controlled by the display controller 103.

FIG. 13 illustrates an example in which a group of icons 71, a group of icons 72, a group of icons 73, a self-timer icon 80, and the live-view image of the subject 2 are displayed on the display section 12. The self-timer icon 80 may include a shooting mode icon 81 and a countdown icon 82. The shooting mode icon 81 may express that the shooting mode is set to the self-timer mode. The countdown icon 82 may express passage of time in the self-timer mode. The countdown icon 82 may display the passage of time in a countdown style on a second unit basis, for example.

The display section pivoting sensing section 107 may include a sensor for sensing a state of the display section 12. The display section pivoting sensing section 107 may sense at least whether the display section 12 is in the first state (in which the display surface 12A is oriented to the rear surface side) or the second state (in which the display surface 12A is oriented to the front surface side).

The orientation sensing section 108 may include a sensor for sensing the orientation of the body 10 of the image pickup apparatus 1. The sensor for sensing the orientation of the body 10 may be a sensor such as an acceleration sensor and a gyro sensor, for example. Alternatively, an angle of the body 10 may be sensed using a sensor such as an angle sensor and a so-called vertical-horizontal sensor, for example. The orientation sensing section 108 may sense at least whether the body 10 is oriented horizontally or is oriented vertically. The orientation sensing section 108 may also sense a horizontal position in a case of using the electronic level.

2. Operation

[2.1 Basic Operation Example of Image Pickup Apparatus]

The image pickup apparatus 1 may operate as follows, for example.

The image pickup apparatus 1 may allow for performing shooting while confirming composition of the subject 2 using one of the viewfinder 20 and the display section 12. The image pickup apparatus 1 may be turned on or off by operating the power button 15. Further, in a particular case of using the viewfinder 20, the image pickup apparatus 1 may be turned on or off automatically in accordance with a popping up operation of the viewfinder 20.

In the present embodiment, the viewfinder 20 may be contained at the contained position P1 inside the body 10, when the viewfinder 20 is not in use as illustrated in FIGS. 1 to 3. Upon using the viewfinder 20, the user may slide the viewfinder operation section 10E provided on the side surface 10D of the body 10. This may pop up the viewfinder unit configuring the viewfinder 20 outside the body 10 as illustrated in FIGS. 4 and 5. The diopter adjuster 26 may be exposed to be operable, when the viewfinder 20 is located at the use position P2.

The image pickup apparatus 1 may have a configuration in which the viewfinder 20 is movable in two or more directions between the contained position P1 at which the viewfinder 20 is contained inside the body 10 and the use position P2 at which the viewfinder 20 is popped up to outside of the body 10. This allows for provision of the opening 13, through which the viewfinder 20 is popped up from and contained inside the body 10, at a location other than the rear surface 10B of the body 10. This makes it possible to reduce the size of the body 10 while achieving increase in size of the lens barrel and increase in size of the screen of the display section 12.

[2.2 Display Example of Display Section]

Next, display examples of the display section 12, for example, suitable for shooting a selfie are described. The display controller 103 may vary the display state of the display section 12 depending on the contained state of the viewfinder 20, when the display section 12 is in the second state (in which the display surface 12A is oriented to the front surface side).

It is to be noted that, in the description below, a state in which the viewfinder 20 is popped up may refer to a state in which the viewfinder 20 is popped up only on the upper side of the body 10 (in the direction illustrated by the arrow A1 in FIGS. 4 and 5), or may refer to a state in which the surface 22A to be in contact with the user's eye is also moved on the rear surface side of the body 10 (in the direction illustrated by the arrow A2 in FIGS. 6 and 7) from the foregoing state.

FIG. 14 illustrates an example of a display region in a case where the display section 12 is in the second state and the viewfinder 20 is popped up. The display controller 103 may allow a display region 12B to be a region other than a portion in which the viewfinder 20 overlaps the display section 12 as viewed from the front surface side as illustrated in FIG. 14, when the display section 12 is in the second state and the viewfinder 20 is popped up from the body 10. The live-view image of the subject 2, the icons, etc. may be displayed in the display region 12B.

FIG. 15 illustrates a display example of the icons in the case where the display section 12 is in the second state and the viewfinder 20 is popped up. The display controller 103 may display a plurality of icons in a region other than a portion in which the viewfinder 20 overlaps the display section 12 as viewed from the front surface side as illustrated in a lower part of FIG. 15, when the display section 12 is in the second state and the viewfinder 20 is popped up from the body 10. For example, display positions of the self-timer icon 80 and the group of icons 73 may be so moved that the self-timer icon 80 and the group of icons 73 do not overlap the viewfinder 20 as viewed from the front surface side. The display positions of the self-timer icon 80 and the group of icons 73 may be moved from a display state illustrated in an upper part of FIG. 15 to a display state illustrated in the lower part of FIG. 15, for example.

The display controller 103 may vary the arrangement state of part of the plurality of icons, as the predetermined icon, depending on the orientation of the body 10, when the display section 12 is in the second state. In this case, the display controller 103 may vary one or both of orientation and a position of the predetermined icon as the arrangement state.

FIG. 16 illustrates a display example of the icons in a case where the display section 12 is in the second state and the body 10 is oriented vertically as illustrated in the lower part of FIG. 11. Referring to FIG. 13, the display controller 103 may allow the plurality of icons to be in a first arrangement state in which the plurality of icons are all oriented in the same direction, when the display section 12 is in the second state and the body 10 is oriented horizontally as illustrated in the upper part of FIG. 11, for example. In contrast, referring to FIG. 16, the display controller 103 may allow only part of the icons as the predetermined icon to be in a second arrangement state, when the display section 12 is in the second state and the body 10 is oriented vertically. The orientation of the self-timer icon 80 (the shooting-mode icon 81 and the countdown icon 82) as the predetermined icon is so varied in the display example illustrated in FIG. 16 from the display example illustrated in FIG. 13 that the orientation of the self-timer icon 80 is vertical in accordance with the orientation of the body 10.

FIG. 17 illustrates a display example of the icons in a case where the display section 12 is in the second state, the body 10 is oriented vertically, and the viewfinder 20 is popped up.

Referring to FIG. 17, the display controller 103 may display the plurality of icons in a region other than a portion in which the viewfinder 20 overlaps the display section 12 as viewed from the front surface side, when the display section 12 is in the second state and the viewfinder 20 is popped up from the body 10. The display positions of the self-timer icon 80 and the group of icons 73 are so varied in the display example illustrated in FIG. 17 from the display example illustrated in FIG. 16 that the self-timer icon 80 and the group of icons 73 do not overlap the viewfinder 20 as viewed from the front surface side.

FIG. 18 illustrates another display example of the icons in the case where the display section 12 is in the second state, the body 10 is oriented vertically, and the viewfinder 20 is popped up. The display position of the self-timer icon 80 is so varied in the display example illustrated in FIG. 18 from the display example illustrated in FIG. 17 that the display position of the self-timer icon 80 is moved from an upper portion of the screen to a lower portion of the screen. It may be preferable that the self-timer icon 80 be so located, for example, in a lower half of the screen as in the display example illustrated in FIG. 18 that the self-timer icon 80 does not disturb confirmation of a state of the subject 2 when shooting a selfie, for example.

Moreover, a position of a face of the subject 2 may be detected to display the self-timer icon 80 in a region other than a portion in which the face of the subject 2 is displayed when shooting a selfie, for example.

3. Effects

According to the present embodiment, the arrangement state of the predetermined icon displayed on the display section 12 may be varied, for example, depending on the orientation of the body 10, when the display surface 12A of the display section 12 is oriented to the front surface side. This makes it possible to perform appropriate information display depending on shooting circumstances.

It is to be noted that the effects described herein are mere examples. The effects of the disclosure are not limited thereto, and may include other effects.

4. Other Embodiments

The technology according to the disclosure is not limited to the description above of the embodiment, and various modifications may be made.

For example, the technology may have any of the following configurations.

(1)

An image pickup apparatus, including:

a body;

a display section that is pivotable on the body between a first state in which a display surface is oriented to rear surface side of the body and a second state in which the display surface is oriented to front surface side of the body; and a display controller that varies an arrangement state of a predetermined icon depending on orientation of the body, when the display section is in the second state, the predetermined icon being displayed on the display section.

(2)

The image pickup apparatus according to (1), wherein the display controller varies one or both of orientation and a position of the predetermined icon as the arrangement state.

(3)

The image pickup apparatus according to (1) or (2), wherein the display controller varies the arrangement state of part of a plurality of icons, as the predetermined icon, the plurality of icons being displayed on the display section.

(4)

The image pickup apparatus according to (3), wherein the display controller allows the plurality of icons to be in a first arrangement state in which the plurality of icons are oriented in same direction, when the display section is in the second state and the orientation of the body is horizontal, and the display controller allows only the predetermined icon to be in a second arrangement state, when the display section is in the second state and the orientation of the body is vertical.

(5)

The image pickup apparatus according to any one of (1) to (4), further including an image pickup controller that performs shooting in a self-timer mode, wherein the predetermined icon includes a countdown icon that expresses passage of time in the self-timer mode.

(6)

The image pickup apparatus according to (5), wherein the predetermined icon includes a shooting mode icon that expresses that a shooting mode is set to the self-timer mode.

(7)

The image pickup apparatus according to any one of (1) to (6), further including a viewfinder that is contained inside the body and is to be popped up from the body when in use, wherein the display controller varies a display state of the display section depending on a contained state of the viewfinder, when the display section is in the second state.

(8)

The image pickup apparatus according to (7), wherein the display controller allows a display region to be a region other than a portion in which the viewfinder overlaps the display section as viewed from the front surface side, when the display section is in the second state and the viewfinder is popped up from the body.

(9)

The image pickup apparatus according to (7) or (8), wherein the display controller allows the predetermined icon to be displayed in a region other than a portion in which the viewfinder overlaps the display section as viewed from the front surface side, when the display section is in the second state and the viewfinder is popped up from the body.

This application claims the priority on the basis of Japanese Patent Application JP 2014-97048 filed on May 8, 2014, and Japanese Patent Application JP 2014-100396 filed on May 14, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image pickup apparatus, comprising:
  a body;
  a display section that is pivotable on the body between a first state and a second state,
    wherein in the first state, a display surface of the display section is along a rear surface side of the body,
    wherein in the second state, the display surface is along a front surface side of the body, and
    wherein the display surface is configured to display, in a first region of the display surface, a first icon of a plurality of icons; and
  a viewfinder configured to pop up from the body and overlap the first region, based on an input; and
  a display controller configured to control the display surface to display the first icon in a second region of the display surface, based on:
    the display section that is in the second state; and
    the viewfinder that is popped up,
  wherein the first region of the display surface is different from the second region of the display surface.

2. The image pickup apparatus according to claim 1, wherein the display controller is further configured to control the display surface to change at least one of an orientation or a position of the first icon.

3. The image pickup apparatus according to claim 1,
  wherein the display surface is further configured to display the plurality of icons,
  wherein the display controller is further configured to control the display surface to change an arrangement state of a part of the plurality of icons, and
  wherein the first icon is separate from the part of the plurality of icons.

4. The image pickup apparatus according to claim 3, wherein the display controller is further configured to control the display surface to:
  display the plurality of icons in a horizontal arrangement state, based on:
    the display section that is in the second state; and
    an orientation of the body that is horizontal, and
  display the part of the plurality of icons in a vertical arrangement state, based on:
    the display section that is in the second state; and
    the orientation of the body that is vertical.

5. The image pickup apparatus according to claim 1, further comprising an image pickup controller configured to shoot in a self-timer mode, wherein a countdown icon of the plurality of icons, indicates passage of time in the self-timer mode.

6. The image pickup apparatus according to claim 5, wherein a shooting mode icon of the plurality of icons, indicates that a shooting mode is set to the self-timer mode.

7. The image pickup apparatus according to claim 1, wherein the display controller is further configured to control the display section to change an arrangement state of the first icon based on:
  an orientation of the body; and
  the display section that is in the second state.

8. The image pickup apparatus according to claim 7,
  wherein the display controller is further configured to determine a display region of the display surface, based on:
    the display section that is in the second state; and
    the viewfinder that is in popped up state, and
  wherein the display region is different from the first region.

* * * * *